(12) United States Patent
Aono et al.

(10) Patent No.: US 12,217,779 B2
(45) Date of Patent: Feb. 4, 2025

(54) METHOD OF MANUFACTURING MAGNETIC RECORDING MEDIUM

(71) Applicant: SHOWA DENKO K.K., Tokyo (JP)

(72) Inventors: Yoshitaka Aono, Chiba (JP); Takahiro Ukai, Chiba (JP); Takanao Ebisawa, Chiba (JP); Kazuya Niwa, Chiba (JP); Takayuki Konno, Chiba (JP)

(73) Assignee: Resonac Hard Disk Corporation, Chiba (JP)

( * ) Notice: Subject to any disclaimer, the term of this patent is extended or adjusted under 35 U.S.C. 154(b) by 38 days.

(21) Appl. No.: 18/146,647

(22) Filed: Dec. 27, 2022

(65) Prior Publication Data

US 2023/0131031 A1  Apr. 27, 2023

Related U.S. Application Data

(62) Division of application No. 17/649,588, filed on Feb. 1, 2022, now Pat. No. 11,823,721.

(30) Foreign Application Priority Data

Feb. 4, 2021 (JP) ................................ 2021-016196

(51) Int. Cl.
  *G11B 5/667* (2006.01)
  *G11B 5/66* (2006.01)
  *G11B 5/851* (2006.01)

(52) U.S. Cl.
  CPC .............. *G11B 5/667* (2013.01); *G11B 5/672* (2021.05); *G11B 5/851* (2013.01)

(58) Field of Classification Search
  None
  See application file for complete search history.

(56) References Cited

U.S. PATENT DOCUMENTS

2004/0202843 A1  10/2004 Moriwaki et al.
2006/0204791 A1  9/2006 Sakawaki et al.
(Continued)

FOREIGN PATENT DOCUMENTS

JP  H07-320257  12/1995
JP  H10-172130  6/1998
(Continued)

*Primary Examiner* — Alexander M Weddle
(74) *Attorney, Agent, or Firm* — IPUSA, PLLC (57) ABSTRACT

A method of manufacturing a magnetic recording medium including: forming a diffusion preventing layer, wherein the magnetic recording medium includes a non-magnetic substrate; an underlayer; a perpendicular magnetic layer; the diffusion preventing layer; and a protective layer, wherein the perpendicular magnetic layer has a multi-layer structure, the perpendicular magnetic layer includes an uppermost layer and at least one layer other than the uppermost layer, the uppermost layer including Co or Fe in magnetic particles, and the at least one layer other than the uppermost layer including an oxide, the diffusion preventing layer is provided between the perpendicular magnetic layer and the protective layer, and the diffusion preventing layer includes at least one component selected from a group consisting of Si, Ti, Cr, B, and Ru, or either a carbide, an oxide, or both, of the at least one component.

4 Claims, 3 Drawing Sheets (56) References Cited

U.S. PATENT DOCUMENTS

| | | | |
|---|---|---|---|
| 2006/0269794 A1* | 11/2006 | Oikawa | G11B 5/737 |
| | | | 428/831 |
| 2013/0094109 A1 | 4/2013 | Marchon et al. | |
| 2013/0209836 A1 | 8/2013 | Ataka et al. | |
| 2015/0213825 A1 | 7/2015 | Sato et al. | |

FOREIGN PATENT DOCUMENTS

| | | | |
|---|---|---|---|
| JP | 2001-352112 | 12/2001 | |
| JP | 2001352112 A * | 12/2001 | ............ B82Y 25/00 |
| JP | 2002-100024 | 4/2002 | |
| JP | 2004-310910 | 11/2004 | |
| JP | 2006-351135 | 12/2006 | |
| JP | 2009-099247 | 5/2009 | |
| WO | 2014/061248 | 4/2014 | |

* cited by examiner

METHOD OF MANUFACTURING MAGNETIC RECORDING MEDIUM

CROSS-REFERENCE TO RELATED APPLICATIONS

The present application is a divisional application of and claims the benefit of priority under 35 U.S.C. 120 of patent application Ser. No. 17/649,588 filed on Feb. 1, 2022, which claims priority to Japanese Patent Application No. 2021-016196, filed Feb. 4, 2021, the contents of which are incorporated herein by reference in their entirety.

BACKGROUND OF THE INVENTION

Field of the Invention

The present invention relates to a magnetic recording medium, a magnetic recording and reproducing apparatus, and a method of manufacturing a magnetic recording medium.

Description of the Related Art

A magnetic recording medium is widely used as a recording medium for recording and storing various data. In a magnetic recording medium, conventionally, an underlayer, a perpendicular magnetic layer, and a protective layer are laminated on a non-magnetic substrate in this order.

Regarding enhancement of recording density of a magnetic recording medium, crystal orientation of a perpendicular magnetic layer is important. Therefore, a magnetic recording medium has been developed that uses, as a perpendicular magnetic layer, a magnetic layer having what is known as a granular structure, in which columnar magnetic particles are surrounded by an oxide and the like.

As the magnetic recording medium using the magnetic layer having such a granular structure, for example, a magnetic recording medium is disclosed that is provided on a non-magnetic substrate with at least an orientation-controlling layer for controlling the orientation of a layer formed directly thereon, and a perpendicular magnetic layer having an easily magnetizing axis oriented mainly perpendicular relative to the non-magnetic substrate, and characterized in that the perpendicular magnetic layer includes two or more magnetic layers where at least one of the magnetic layers is a layer having Co as a main component and containing Pt as well and containing an oxide and where at least another of the magnetic layers is a layer having Co as a main component and containing Cr as well and containing no oxide (see, for example, Japanese Unexamined Patent Application Publication No. 2004-310910).

As a scope of application of the magnetic recording and reproducing apparatus becomes wider, further enhancement of recording density of the magnetic recording medium is required. As a method that can improve recording density of the magnetic recording medium, there is a method of increasing deposition temperature of a perpendicular magnetic layer and increasing crystal orientation of the perpendicular magnetic layer.

However, when the deposition temperature of the perpendicular magnetic layer is increased, a problem may occur. That is, the composition of the perpendicular magnetic layer changes because the element constituting the perpendicular magnetic layer diffuses to other layers that constitutes the magnetic recording medium, resulting in deterioration of the magnetic property. In particular, when the oxide contained in the perpendicular magnetic layer diffuses to the surface of the magnetic recording medium by heat diffusion due to heat during manufacturing, an impurity in the atmosphere enters inside the magnetic recording medium through the diffusion path, and consequently the magnetic recording medium corrodes.

The present invention has an object to provide a magnetic recording medium having high corrosion resistance.

SUMMARY OF THE INVENTION

According to an embodiment, a method of manufacturing a magnetic recording medium includes: forming a diffusion preventing layer by a reactive sputtering method, an ion implantation method, or an ion etching method, wherein the magnetic recording medium includes a non-magnetic substrate; an underlayer; a perpendicular magnetic layer; the diffusion preventing layer; and a protective layer, wherein the underlayer, the perpendicular magnetic layer, the diffusion preventing layer, and the protective layer are layered on the non-magnetic substrate in this order, the perpendicular magnetic layer has a multi-layer structure, the perpendicular magnetic layer includes an uppermost layer and at least one layer other than the uppermost layer, the uppermost layer including Co or Fe in magnetic particles, and the at least one layer other than the uppermost layer including an oxide, the diffusion preventing layer is provided between the perpendicular magnetic layer and the protective layer, and the diffusion preventing layer includes at least one component selected from a group consisting of Si, Ti, Cr, B, and Ru, or either a carbide, an oxide, or both, of the at least one component.

According to an aspect of the present invention, a magnetic recording medium having high corrosion resistance can be provided.

DESCRIPTION OF THE EMBODIMENTS

In the following, embodiments of the present invention will be described in detail. In order to facilitate understanding of the description, the same components in the drawings are denoted by the same reference numerals, and overlapping descriptions are omitted. Also, the scale of each member in the drawings may be different from the actual scale. As used herein, "X to Y" indicating a numerical range is meant to include a lower limit and an upper limit that are given as numerical values before and after "to", unless otherwise noted.

First Embodiment

[Magnetic Disks]

A magnetic recording medium according to a first embodiment of the present invention will be described. The magnetic recording medium according to the present embodiment includes a soft magnetic layer, a seed layer, an underlayer, a perpendicular magnetic layer, a diffusion preventing layer, and a protective layer, which are layered on a non-magnetic substrate in this order. The perpendicular magnetic layer includes a Co—Cr alloy.

Figure 1:
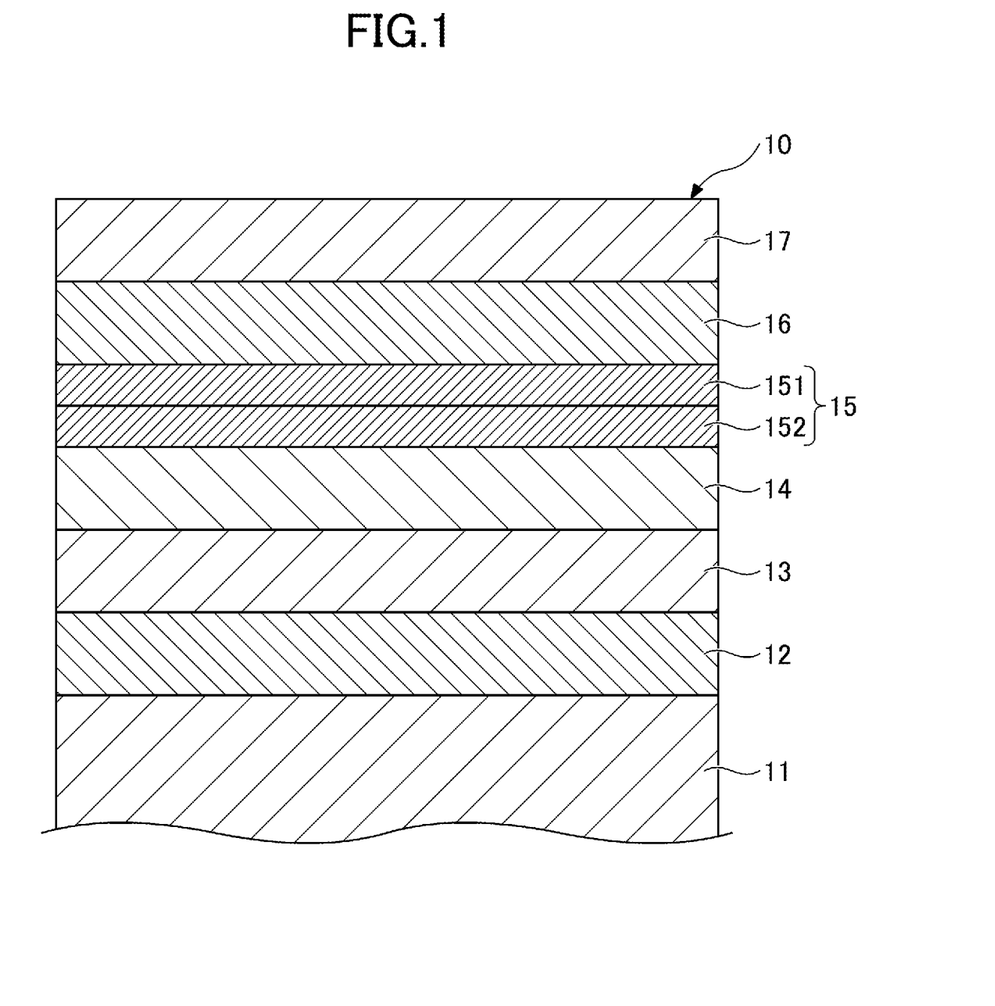
FIG. 1 is a cross-sectional view illustrating a configuration example of a magnetic recording medium according to the present embodiment.

FIG. 1 is a schematic cross-sectional view illustrating a configuration example of the magnetic recording medium according to the present embodiment. As illustrated in FIG. 1, a magnetic recording medium 10 includes a non-magnetic substrate 11, a soft magnetic layer 12, a seed layer 13, an underlayer 14, a perpendicular magnetic layer 15, a diffusion preventing layer 16, and a protective layer 17. The soft magnetic layer 12, the seed layer 13, the underlayer 14, the perpendicular magnetic layer 15, the diffusion preventing layer 16, and the protective layer 17 are layered on the non-magnetic substrate 11 in this order.

Examples of a material for the non-magnetic substrate 11 include Al alloys such as Al—Mg alloy, soda glass, aluminosilicate glass, amorphous glass, silicon, titanium, ceramics, sapphire, quartz, resin, and the like. Among these, Al alloys, and glass such as crystallized glass and amorphous glass, are preferred.

The soft magnetic layer 12 is deposited on the non-magnetic substrate 11. When recording a signal on the magnetic recording medium 10, the soft magnetic layer 12 has a function of guiding a recording magnetic field from a magnetic head and efficiently applying a vertical component of the recording magnetic field to the perpendicular magnetic layer 15.

Examples of a material for the soft magnetic layer 12 include soft magnetic alloys such as Fe—Co alloys, Co—Zr—Nb alloys, and Co—Ta—Zr alloys.

The soft magnetic layer 12 preferably has an amorphous structure. Accordingly, the surface smoothness of the soft magnetic layer 12 can be enhanced, and as a result, the floating amount of the magnetic head is reduced, and the recording density of the magnetic recording medium 10 can be further enhanced.

A plurality of the soft magnetic layers 12 may be deposited, via a non-magnetic layer such as a Ru film, to be an anti-ferromagnetic coupling (AFC) film.

Total thickness of the soft magnetic layer 12 is appropriately determined according to both the recording and reproduction characteristics, and the OW (overwrite) characteristics, of the magnetic recording medium 10. The total thickness of the soft magnetic layer 12 is preferably in the range of 20 nm to 120 nm.

The seed layer 13 is deposited on the soft magnetic layer 12, and has a function of enhancing (002) plane orientation of the underlayer 14.

Examples of a material for the seed layer 13 include preferably a material having an hcp structure, an fcc structure, or an amorphous structure. For example, Ru alloys, Ni alloys, Co alloys, Pt alloys, Cu alloys, and the like may be used.

The thickness of the seed layer 13 is preferably in the range of 0.5 nm to 20 nm, and more preferably 3 nm to 10 nm. By setting the thickness of the seed layer 13 within the above-described preferred range, (002) plane orientation of the underlayer 14 can be stabilized.

The underlayer 14 is deposited on the seed layer 13, and has a function of improving (002) plane orientation of the perpendicular magnetic layer 15.

As a material for the underlayer 14, Ru having a hcp structure, or its alloys may be used.

The average crystal grain size of the underlayer 14 is preferably in the range of 6 nm to 20 nm, and more preferably 6 nm to 8 nm.

The thickness of the underlayer 14 may be suitably designed, and is preferably 5 nm to 30 nm, for example.

The perpendicular magnetic layer 15 is deposited on the underlayer 14. The perpendicular magnetic layer 15 is a layer in which information is recorded. The perpendicular magnetic layer 15 has a multi-layer structure including an uppermost layer 151 and a layer 152 other than the uppermost layer. In the present embodiment, the perpendicular magnetic layer 15 includes Co—Cr alloy. The uppermost layer 151 includes Co in the magnetic particles, and the layer 152 other than the uppermost layer includes an oxide. When the layer 152 other than the uppermost layer includes a plurality of layers, at least one layer of the layer 152 may include an oxide.

In a case where the perpendicular magnetic layer 15 does not contain an oxide, examples of a material for the perpendicular magnetic layer 15 include CoCr, CoCrPt, CoCrPtB, and the like. In a case where the perpendicular magnetic layer 15 contains an oxide, examples of a material for the perpendicular magnetic layer 15 include CoCrPt—$B_2O_3$, CoCrPt—$SiO_2$, CoCrPt—$Cr_2O_3$, CoCrPt—$TiO_2$, CoCrPt—$ZrO_2$, CoCrPt—$Nb_2O_5$, CoCrPt—$Ta_2O_5$, CoCrPt—$TiO_2$, and the like.

In a case where the perpendicular magnetic layer 15 contains an oxide, the oxide surrounds a crystal grain of the Co—Cr alloy, thereby forming a granular structure. As a result, the magnetic interaction between the crystal grains of the Co—Cr alloy is decreased, and noise is reduced.

As a method of depositing the soft magnetic layer 12, the seed layer 13, the underlayer 14, and the perpendicular magnetic layer 15, a DC magnetron sputtering method, or an RF sputtering method may be used.

When depositing the soft magnetic layer 12, the seed layer 13, the underlayer 14, and the perpendicular magnetic layer 15, RF (Radio Frequency) bias, DC bias, pulse DC, pulse DC bias, and the like may be used, if necessary.

As a reactive gas, $O_2$ gas, $H_2O$ gas, $N_2$ gas, and the like may be used.

The sputtering gas pressure is adjusted as appropriate to optimize the characteristics of each layer, and is usually in the range of approximately 0.1 Pa to 30 Pa.

The diffusion preventing layer 16 is provided between the perpendicular magnetic layer 15 having a multi-layer structure and the protective layer 17, and has a function of preventing the oxide included in the perpendicular magnetic layer 15 from diffusing to the surface of the magnetic recording medium 10. The diffusion preventing layer 16 prevents the oxide contained in the perpendicular magnetic layer 15 from diffusing to the surface of the magnetic recording medium 10, thereby eliminating generation of a corrosion path in the magnetic recording medium 10 and increasing the corrosion resistance.

The inventors of the present application investigated as follows. The non-magnetic substrate 11 is heated when the magnetic recording medium 10 is manufactured, and the oxide contained in the perpendicular magnetic layer 15 diffuses to the surface through the crystal grain boundaries and the like of the perpendicular magnetic layer 15 and the protective layer 17. Through the diffusion path thus formed, impurities in the atmosphere penetrate inside the magnetic recording medium 10 and corrode each layer constituting the magnetic recording medium 10. In particular, oxides of Co and oxides of Fe tend to diffuse to the surface of the magnetic recording medium 10. Thus, focus is placed on the importance of preventing the diffusion of the oxide.

The inventors have considered providing the diffusion preventing layer 16 having a specific composition between the perpendicular magnetic layer 15 and the protective layer 17. The diffusion preventing layer 16 is a layer that is basically uninvolved in information recording. When the diffusion preventing layer 16 is provided between the perpendicular magnetic layer 15 and a magnetic head, the distance between the perpendicular magnetic layer and the magnetic head increases, and this deteriorates the reading and writing of information. Therefore, the diffusion preventing layer 16 needs to be thin, and at the same time, be able to prevent the oxide from diffusing. Also, the diffusion preventing layer 16 needs to have a high adhesion property and lattice matching to/with the uppermost layer 151 of the perpendicular magnetic layer 15, and to/with the protective layer 17.

The inventors of the present application explored materials satisfying the above conditions and found that one or more materials selected from the group including Si, Ti, Cr, B, and Ru, or either a carbide, an oxide, or both, of the at least one component, can be used as the diffusion preventing layer 16. Specifically, examples include Si, Ti, Cr, B, Ru, and the like as a simple substance; SiC, TiC, $Cr_{23}C_6$, $Cr_7C_3$, $B_4C$, RuC, and the like as carbides of the simple substance; $TiO_2$, $Cr_2O_3$, $B_2O_3$, $RuO_2$, $RuO_4$, and the like, as oxides of the simple substance.

The content of Si, Ti, Cr, B, and Ru contained in the diffusion preventing layer 16 is preferably 0.5 at % to 10 at %, and more preferably 2 at % to 4 at %, from the viewpoint of preventing oxide diffusion.

The thickness of the diffusion preventing layer 16 is preferably 0.02 nm to 0.4 nm, and more preferably 0.4 nm to 2 nm, from the viewpoint of preventing oxide diffusion and making the diffusion preventing layer 16 as thin as possible.

The diffusion preventing layer 16 preferably further includes cobalt oxide or iron oxide. As described above, although cobalt oxide and iron oxide are materials that tend to diffuse to the surface of the magnetic recording medium 10, when cobalt oxide or iron oxide are included in the diffusion preventing layer 16, the effect of preventing the diffusion of the oxide can be enhanced.

Specific examples of cobalt oxide and iron oxide include CoO, $Fe_2O_3$, and FeO.

The content of cobalt oxide and iron oxide is preferably 0.1 mol % to 4 mol %.

The diffusion preventing layer 16 preferably further includes C. When the diffusion preventing layer 16 includes C, the adhesion property and lattice matching to/with the uppermost layer 151 of the perpendicular magnetic layer 15 and to/with the protective layer 17 can be improved. Examples of a source of C includes a deposition gas when the diffusion preventing layer 16 is formed, a deposited substance from a target, a diffused substance from the protective layer 17, and the like.

The content of C is preferably 20 at % or more.

The diffusion preventing layer 16 may be formed by any publicly-known method, such as a sputtering method. Examples of the method include reactive sputtering, ion implantation, ion etching, and the like, so that the diffusion preventing layer 16 is increased in crystallinity and made to be a thin film, and the adhesion property and lattice matching of the diffusion preventing layer 16 to/with the layers that contact to the diffusion preventing layer 16 can be improved.

When the diffusion preventing layer 16 containing Si is formed by the reactive sputtering, Si, SiC, $SiO_2$, Si—Co, $SiO_2$—Co, $SiO_2$—CoO, and SiC—CoO may be used as a target. The diffusion preventing layer 16 containing Si may be formed by adding oxygen to a sputter gas, using, as a depositing method, the RF sputtering method, the DC magnetron sputtering method, or the like.

When the diffusion preventing layer 16 containing Si is formed by the ion implantation, Si is ion-implanted onto the deposition surface of the perpendicular magnetic layer 15. As a source of Si, it is preferably to use a gas containing an organosilicon compound. Because the organosilicon compound contains C in addition to Si, C can be efficiently included in the diffusion preventing layer 16. In addition, because the organosilicon compound contains H, the plasma in the deposition space can be activated. Therefore, the diffusion preventing layer 16 can have high crystallinity.

The diffusion preventing layer 16 containing Si may be formed by the ion implantation as follows. A Si film, a Si—Co film, or the like are formed on the surface of the perpendicular magnetic layer 15, and then oxygen ions or carbon ions and the like are injected into the Si film, the Si—Co film, or the like.

The diffusion preventing layer 16 containing Si may be formed by the ion etching as follows. A Si film, a Si—Co film, or the like are formed on the surface of the perpendicular magnetic layer 15, and then the surface of the film is etched using oxygen ions or carbon ions and the like.

It is also effective to etch the surface of the perpendicular magnetic layer 15 with a gas containing an organosilicon compound. Because the organosilicon compound contains C, C can be efficiently included in the diffusion preventing layer 16.

When the diffusion preventing layer 16 includes Ti, Cr, B, Ru, and the like, a manufacturing method that is substantially the same as the above-described method when the diffusion preventing layer 16 contains Si may be used.

The protective layer 17 has a function to protect the magnetic recording medium 10 from damage or the like caused by a contact between the magnetic head and the magnetic recording medium 10.

The protective layer 17 may include carbon.

The protective layer 17 may be formed by, for example, a sputtering method, a plasma CVD method, an ion beam method, and the like.

The thickness of the protective layer 17 is preferably 1 nm to 10 nm, and more preferably 2 nm to 6 nm.

The magnetic recording medium 10 according to the present embodiment includes the underlayer 14, the perpendicular magnetic layer 15, the diffusion preventing layer 16, and the protective layer 17, which are layered on the non-magnetic substrate 11 in this order. The perpendicular magnetic layer 15 has a multi-layer structure. The uppermost layer 151 of the perpendicular magnetic layer 15 includes Co or Fe in the magnetic particles. The layer 152 other than the uppermost layer of the perpendicular magnetic layer 15 includes an oxide. The diffusion preventing layer 16 is disposed between the perpendicular magnetic layer 15 and the protective layer 17, and includes at least one component selected from the group consisting of Si, Ti, Cr, B, and Ru, or either a carbide, an oxide, or both, of the at least one component. Accordingly, it is possible to prevent the oxide contained in the perpendicular magnetic layer 15 from diffusing to the surface of the magnetic recording medium 10, thereby eliminating generation of a corrosion path in the magnetic recording medium 10. Therefore, the magnetic recording medium 10 can have high corrosion resistance.

The content of Si, Ti, Cr, B, and Ru included in the diffusion preventing layer 16 of the magnetic recording medium 10 may be 0.5 at % to 10 at %. Accordingly, it is possible to prevent the oxide of Co and the oxide of Fe from diffusing to the surface of the magnetic recording medium 10. Thus, the corrosion of each layer included in the magnetic recording medium 10 can be more reliably suppressed. Therefore, the magnetic recording medium 10 can have higher corrosion resistance.

In the magnetic recording medium 10, the thickness of the diffusion preventing layer 16 may be 0.02 nm to 0.4 nm. Accordingly, it is possible to prevent the oxide of Co and the oxide of Fe from diffusing to the surface of the magnetic recording medium 10. Thus, the corrosion of each layer included in the magnetic recording medium 10 can be more reliably suppressed while preventing the increase in the thickness of the diffusion preventing layer 16. Therefore, the magnetic recording medium 10 can have higher corrosion resistance, and can be made thinner.

In the magnetic recording medium 10, the diffusion preventing layer 16 may further include cobalt oxide or iron oxide. Among oxides, particularly, cobalt oxide and iron oxide are materials that tend to diffuse to the surface of the magnetic recording medium 10. When cobalt oxide or iron oxide are included in the diffusion preventing layer 16, the effect of preventing the diffusion of the oxide can be enhanced. Therefore, the corrosion resistance of the magnetic recording medium 10 can be more reliably increased.

In the magnetic recording medium 10, the diffusion preventing layer 16 may further include C. When the diffusion preventing layer 16 includes C, the adhesion property and lattice matching to/with the uppermost layer 151 of the perpendicular magnetic layer 15 and to/with the protective layer 17 can be improved. Therefore, in the magnetic recording medium 10, the adhesion property to the perpendicular magnetic layer 15 and to the protective layer 17 can be improved.

<Magnetic Recording and Reproducing Apparatus>

Figure 3:
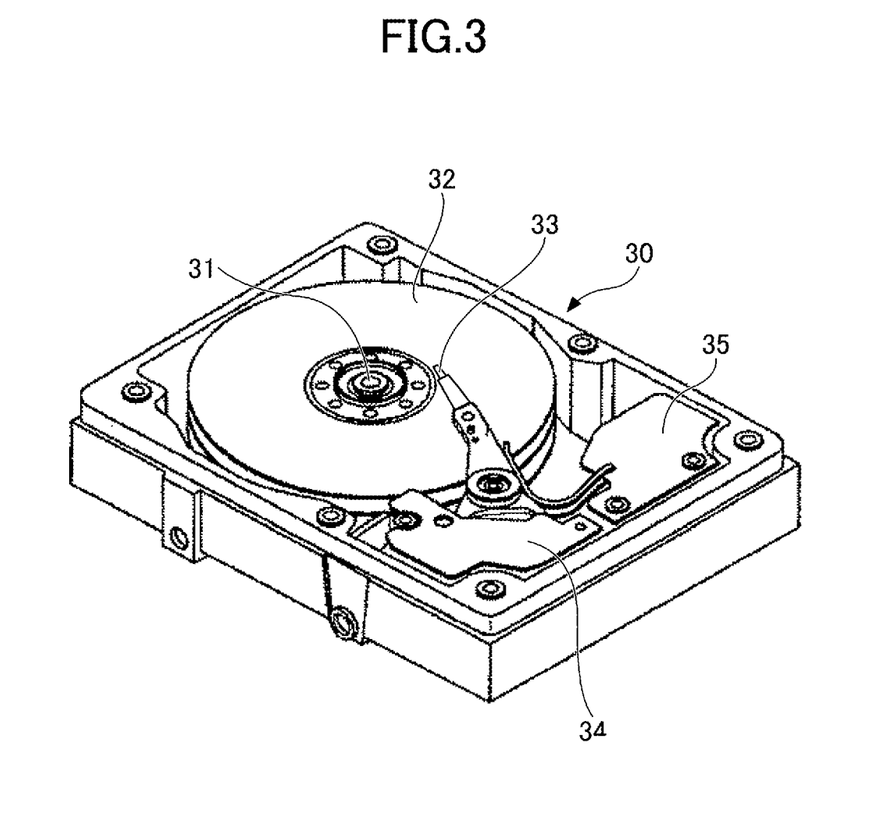
FIG. 3 is a schematic diagram illustrating an example of a magnetic recording and reproducing apparatus according to the present embodiment.

A magnetic recording and reproducing apparatus using a magnetic recording medium according to the present embodiment will be described. FIG. 3 is a perspective view illustrating an example of a magnetic recording and reproducing apparatus according to the present embodiment. As shown in FIG. 3, a magnetic recording and reproducing apparatus 30 includes a magnetic recording medium 31, a magnetic recording medium driving part 32 for rotating the magnetic recording medium 31, a magnetic head 33 having a near field light-generating element at a distal end, a magnetic head driving part 34 for moving the magnetic head 33, and a recording and reproducing signal processing part 35. As the magnetic recording medium 31, the magnetic recording medium 10 and the magnetic recording medium 20 according to the previous embodiment may be used.

A central portion of the magnetic recording medium 31 is attached to a rotation axis of a spindle motor, whereby the magnetic recording medium 31 is driven to rotate by the spindle motor. The magnetic head 33 runs at a floating position on the surface of the magnetic recording medium 31. In this manner, the magnetic recording and reproducing apparatus 30 writes or reads information to or from the magnetic recording medium 31.

The magnetic recording and reproducing apparatus 30 according to the present embodiment uses the magnetic recording medium 10 or the magnetic recording medium 20 according to the present embodiments. The magnetic recording and reproducing apparatus 30 according to the present embodiments can have high durability because the corrosion of the magnetic recording medium 10 or the magnetic recording medium 20 can be prevented.

Second Embodiment

A magnetic recording medium according to a second embodiment of the present invention will be described. The magnetic recording medium according to the present embodiment includes a seed layer, an underlayer, a perpendicular magnetic layer, a diffusion preventing layer, and a protective layer, which are layered on a non-magnetic substrate in this order. The underlayer is composed of a plurality of layers. The perpendicular magnetic layer includes at least one of a Fe—Pt alloy or a Co—Pt alloy.

Figure 2:
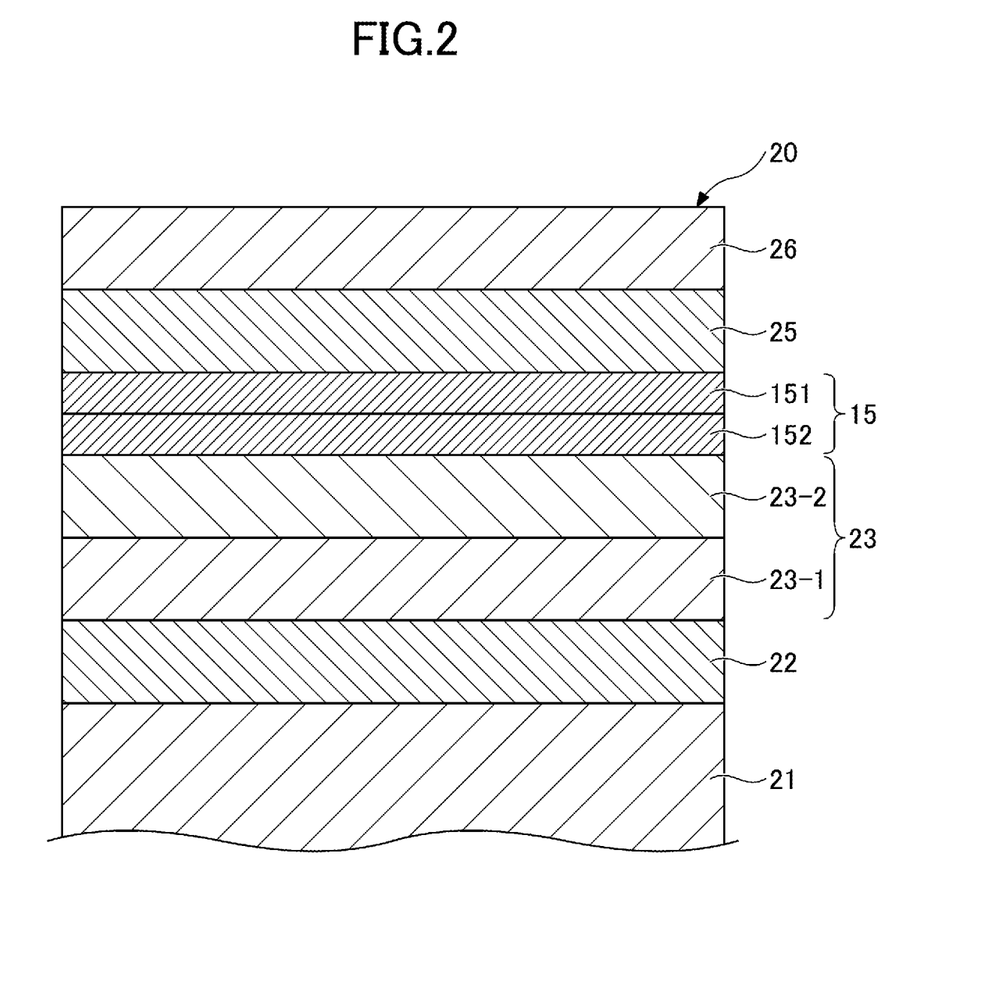
FIG. 2 is a cross-sectional view illustrating a configuration example of a magnetic recording medium according to the present embodiment.

FIG. 2 is a schematic cross-sectional view illustrating a configuration example of the magnetic recording medium according to the present embodiment. As illustrated in FIG. 2, a magnetic recording medium 20 includes a non-magnetic substrate 21, a seed layer 22, an underlayer 23, a perpendicular magnetic layer 24, a diffusion preventing layer 25, and a protective layer 26. The seed layer 22, the underlayer 23, the perpendicular magnetic layer 24, the diffusion preventing layer 25, and the protective layer 26 are layered on the non-magnetic substrate 21 in this order. The underlayer 23 includes a first underlayer 23-1 and a second underlayer 23-2. The first underlayer 23-1 and the second underlayer 23-2 are layered in this order. The non-magnetic substrate 21, the diffusion preventing layer 25, and the protective layer 26, are substantially the same as the non-magnetic substrate 11, the diffusion preventing layer 16, and the protective layer 17, respectively, included in the magnetic recording medium 10 according to the first embodiment illustrated in FIG. 1. Therefore, descriptions of these are omitted.

Preferably, each of the seed layer 22, the first underlayer 23-1, and the second underlayer 23-2 is lattice-matched with the perpendicular magnetic layer 24. Accordingly, (001) plane orientation of the perpendicular magnetic layer 24 can be further enhanced.

As the seed layer 22, the first underlayer 23-1, and the second underlayer 23-2, for example, Cr, W, MgO, and the like having (100) plane orientation may be used. By forming the seed layer 22, the first underlayer 23-1, and the second underlayer 23-2, using Cr, W, MgO, and the like having (100) plane orientation and by forming these layers in a multi-layer structure, the lattice misfit between each layer can be 10% or less.

A Cr layer having a bcc structure, a Cr alloy layer containing Cr as a main component, or an alloy layer having a B2 structure, may be further formed under the seed layer 22, the first underlayer 23-1, or the second underlayer 23-2. Accordingly, the first underlayer 23-1 and the second underlayer 23-2 having (100) plane orientation can be reliably formed.

Examples of the Cr alloy forming the Cr alloy layer include Cr—Mn alloy, Cr—Mo alloy, Cr—W alloy, Cr—V alloy, Cr—Ti alloy, Cr—Ru alloy, and the like.

Examples of the alloy having a B2 structure include Ru—Al alloy, Ni—Al alloy, and the like.

The seed layer 22, the first underlayer 23-1, or the second underlayer 23-2, or any combination thereof may also include an oxide. Accordingly, the seed layer 22, the first underlayer 23-1, or the second underlayer 23-2, or any combination thereof can be improved in lattice matching with the perpendicular magnetic layer 24.

Examples of the oxide include oxides of one or more metals selected from the group consisting of Ni, Cr, Mo, Nb, Ta, V, and W. Among these, preferred examples of the metal oxides include NiO, CrO, $Cr_2O_3$, $CrO_3$, $MoO_2$, $MoO_3$, $Nb_2O_5$, $Ta_2O_5$, $V_2O_3$, $VO_2$, $WO_2$, $WO_3$, $WO_6$, and the like.

The content of oxide in the seed layer 22, the first underlayer 23-1, or the second underlayer 23-2, or any combination thereof is preferably in the range of 2 mol % to 30 mol %, and more preferably in the range of 10 mol % to 25 mol %. When the content of oxide in the seed layer 22, the first underlayer 23-1, or the second underlayer 23-2, or any combination thereof is within the above-described preferred range, (001) plane orientation of the perpendicular magnetic layer 24 can be further improved, and (100) plane orientation of the seed layer 22, the first underlayer 23-1, and the second underlayer 23-2, or any combination thereof can be further improved.

As a material for forming the first underlayer 23-1, for example, a Co—Ti alloy having a Ti content of 50 at % with the balance of Co may be used. The thickness of the first underlayer 23-1 is preferably 30 nm to 100 nm, and more preferably approximately 50 nm, for example.

As a material for forming the second underlayer 23-2, for example, NiO can be used. The thickness of the second underlayer 23-2 is preferably 3 nm to 10 nm, and more preferably approximately 5 nm, for example.

As a method of forming the seed layer 22, the first underlayer 23-1, and the second underlayer 23-2, a publicly-known method, such as a sputtering method, may be used.

The perpendicular magnetic layer 24 is disposed on the second underlayer 23-2, and includes a Fe—Pt alloy or a Co—Pt alloy.

Preferably, the perpendicular magnetic layer 24 includes an alloy having an $L1_0$ crystalline structure, and has (001) plane orientation.

Preferably, the alloy having the $L1_0$ structure has a high magnetic anisotropy constant Ku, and is heat treated during deposition in order to promote regularization of the alloy.

The perpendicular magnetic layer 24 has a function of recording information, and has a multi-layer structure. In a case where the perpendicular magnetic layer 24 includes a Fe—Pt alloy or a Co—Pt alloy, the uppermost layer 241 of the perpendicular magnetic layer 24 includes Co or Fe in the magnetic particles, and a layer 242 other than the uppermost layer includes an oxide. In a case where the layer 242 other than the uppermost layer includes a plurality of layers, at least one layer of the layer 242 other than the uppermost layer may include an oxide.

Co or Fe included in the magnetic particles of the uppermost layer 151 may be derived from a Fe—Pt alloy, a Co—Pt alloy, or other alloys such including Co or Fe. For example, a Co magnetic layer, a Fe magnetic layer, a Co—Cr magnetic layer, and a Co—Cr—Pt magnetic layer may be disposed on a magnetic layer that includes a Fe—Pt alloy and a Co—Pt alloy having an $L1_0$ structure. These magnetic layers may have hcp structure or bcc structure.

Preferably, in the perpendicular magnetic layer 24, the layer 152 other than the uppermost layer contains magnetic particles of a Fe—Pt alloy and a Co—Pt alloy that have an $L1_0$ structure, and one or more oxides selected from the group consisting of $SiO_2$, $TiO_2$, $Cr_2O_3$, $Al_2O_3$, $Ta_2O_5$, $ZrO_2$, $Y_2O_3$, $CeO_2$, $GeO_2$, MnO, TiO, ZnO, and $B_2O_3$. Accordingly, the exchange bond between the crystal particles can be more reliably divided, and the signal-to-noise ratio (SNR) of the magnetic recording medium 20 can be further enhanced.

Specifically, the perpendicular magnetic layer 24 may be formed using (Fe-45 at % Pt)—8 mol % $SiO_2$—4 mol % $Cr_2O_3$ alloy (that is, an alloy having a $SiO_2$ content of 8 mol %, a $Cr_2O_3$ content of 4 mol %, and the balance (a content of Pt is 45 at % with the balance of Fe)), for example.

The average particle diameter of the magnetic particles contained in the perpendicular magnetic layer 24 is preferably 10 nm or less, from the viewpoint of increasing the recording density. As the average particle diameter of the magnetic particles decreases, the magnetic particles tends to become susceptible to thermal fluctuation, which occurs immediately after writing magnetic information to the magnetic layer 44.

The average particle diameter of the magnetic particles may be determined using TEM observation images. For example, the particle diameter (diameter equivalent to a circle) of 200 magnetic particles are measured using the observation image of TEM. The particle diameter at an integrated value of 50% may be used as the average particle diameter. The average grain boundary width of the magnetic particles is preferably 0.3 nm to 2.0 nm.

The thickness of the perpendicular magnetic layer 24 is preferably 1 nm to 20 nm, and is more preferably 3 nm to 15 nm. When the thickness of the perpendicular magnetic layer 24 is within the above-described preferred range, a reproduction output can be improved, and an enlargement of the crystal particles can be prevented. In a case where the perpendicular magnetic layer 24 has a multi-layer structure, the thickness of the perpendicular magnetic layer 24 represents the total thickness of all layers.

The seed layer 22, the first underlayer 23-1, the second underlayer 23-2, and the perpendicular magnetic layer 24, may all be formed by any publicly-known method, such as a sputtering method.

The magnetic recording medium 20 according to the present embodiment includes the underlayer 23, the perpendicular magnetic layer 24, the diffusion preventing layer 25, and the protective layer 26, on the non-magnetic substrate 21 in this order. The perpendicular magnetic layer 24 has a multi-layer structure. The uppermost layer 241 of the perpendicular magnetic layer 24 includes Co or Fe in the magnetic particles. The layer 242 other than the uppermost layer of the perpendicular magnetic layer 24 includes an oxide. The diffusion preventing layer 25 has substantially the same structure as the diffusion preventing layer 16 of the magnetic recording medium 10 according to the first embodiment. Accordingly, it is possible to prevent the oxide contained in the diffusion preventing layer 25 from diffusing to the surface of the magnetic recording medium 20, thereby eliminating generation of a corrosion path in the magnetic recording medium 20. Therefore, the magnetic recording medium 20, as the magnetic recording medium 10, can have high corrosion resistance.

The diffusion preventing layer 25 has substantially the same configuration as the diffusion preventing layer 16 of the magnetic recording medium 10 according to the first embodiment. Therefore, the magnetic recording medium 20 can exert the following effect, substantially the same as that of the magnetic recording medium 10.

In the magnetic recording medium 20, the content of Si, Ti, Cr, B, and Ru contained in the diffusion preventing layer 25 may be 0.5 at % to 10 at %. Accordingly, it is possible to prevent the oxide of Co and the oxide of Fe from diffusing to the surface of the magnetic recording medium 20. Thus, the corrosion of each layer included in the magnetic recording medium 20 can be more reliably suppressed. Therefore, the magnetic recording medium 20 can have higher corrosion resistance.

In the magnetic recording medium 20, the thickness of the diffusion preventing layer 25 may be 0.02 nm to 0.4 nm. Accordingly, it is possible to prevent the oxide of Co and the oxide of Fe from diffusing to the surface of the magnetic recording medium 20. Thus, the corrosion of each layer included in the magnetic recording medium 20 can be more reliably suppressed while preventing the increase in the thickness of the diffusion preventing layer 25. Therefore, the magnetic recording medium 20 can have higher corrosion resistance, and can be made thinner.

In the magnetic recording medium 20, the diffusion preventing layer 25 may further include cobalt oxide or iron oxide. Among oxides, particularly, cobalt oxide and iron oxide are materials that tend to diffuse to the surface of the magnetic recording medium 20. When cobalt oxide or iron oxide are included in the diffusion preventing layer 25, the effect of preventing the diffusion of the oxide can be enhanced. Therefore, the corrosion resistance of the magnetic recording medium 20 can be more reliably increased.

In the magnetic recording medium 20, the diffusion preventing layer 25 may further include C. When the diffusion preventing layer 25 includes C, the adhesion property and lattice matching to/with the uppermost layer 241 of the perpendicular magnetic layer 24 and to/with the protective layer 26 can be improved. Therefore, in the magnetic recording medium 20, the adhesion property to the perpendicular magnetic layer 24 and to the protective layer 26 can be improved.

EXAMPLES

In the following, embodiments will be specifically described with reference to Examples and Comparative Examples, but the embodiments are not limited to these Examples and Comparative Examples.

Example 1

[Preparation of Magnetic Recording Medium]

Magnetic recording media were prepared by the following method.

A cleaned non-magnetic substrate made of glass and having an outer diameter of 2.5 inches (manufactured by HOYA Corporation) was put in a film deposition chamber of a DC magnetron sputtering apparatus C-3040 (manufactured by Anelva Corporation), and the film deposition chamber was evacuated until the ultimate vacuum reached $1 \times 10^{-5}$ Pa.

Next, as a target, using Cr—50 at % Ti (the content of Ti is 50 at % with the balance of Cr), an adhesion layer having a thickness of 10 nm was deposited on the non-magnetic substrate.

Next, as a target, using Co—20 at % Fe—5 at % Zr—5 at % Ta (the content of Fe is 20 at %, the content of Zr is 5 at %, and the content of Ta is 5 at %, with the balance of Co), setting the temperature of the non-magnetic substrate to 100° C. or less, a soft magnetic layer having a thickness of 25 nm was deposited on the adhesion layer.

Next, as a target, using Ru, a Ru layer as a non-magnetic layer having a thickness of 0.7 nm was deposited on the soft magnetic layer.

Next, as a target, using Co—20 at % Fe-5 at % Zr-5 at % Ta, setting the temperature of the non-magnetic substrate to 100° C. or less, a soft magnetic layer having a thickness of 25 nm was deposited on the Ru layer, to be a soft magnetic underlayer.

Next, as targets, using Ni—6 at % W (the content of W is 6 at %, with the balance of Ni) and Ru, a Ni—6 at % W layer having a thickness of 5 nm and a Ru layer having a thickness of 20 nm were deposited on the soft magnetic underlayer, to be an orientation-controlled underlayer.

Next, as a target, using 91 mol % (Co—15 at % Cr—18 at % Pt)—6 mol % $SiO_2$—3 mol % $TiO_2$ (the content of an alloy (the content of Cr is 15 at %, the content of Pt is 18 at %, with the balance of Co) is 91 mol %, the content of $SiO_2$ is 6 mol %, and the content of $TiO_2$ is 3 mol %), a perpendicular magnetic layer having a thickness of 9 nm and having a granular structure was deposited on the orientation-controlled underlayer. At this time, a sputtering pressure was set to 2 Pa.

Next, as a target, using 88 mol % (Co—30 at % Cr)—12 mol % $TiO_2$ (the content of an alloy (the content of Cr is 30 at % with the balance of Co) is 8 mol %, the content of $TiO_2$ is 12 mol %), a non-magnetic layer having a thickness of 0.3 nm and having a granular structure was deposited on the perpendicular magnetic layer.

Next, as a target, using 92 mol % (Co—11 at % Cr—18 at % Pt)—5 mol % $SiO_2$—3 mol % $TiO_2$ (the content of an alloy (the content of Cr is 11 at %, and the content of Pt is 18 at %, with the balance of Co) is 92 mol %, the content of $SiO_2$ is 5 mol %, and the content of $TiO_2$ is 3 mol %), a perpendicular magnetic layer having a thickness of 6 nm and having a granular structure was deposited on the non-magnetic layer. At this time, a sputtering pressure was set to 2 Pa.

Next, as a target, using Co—11 at % Cr—18 at % Pt (the content of Cr is 11 at %, and the content of Pt is 18 at %, with the balance of Co), a perpendicular magnetic layer having a thickness of 10 nm was deposited. At this time, a sputtering pressure was set to 0.6 Pa. The substrate temperature was 310° C. when the perpendicular magnetic layer was deposited.

Next, a diffusion preventing layer was deposited by performing ion implantation on the surface of the perpendicular magnetic layer that was formed using Co—11 at % Cr—18 at % Pt as a target. The ion implantation was performed using, as a reaction gas, a mixed gas of tetramethylsilane ($C_4H_{12}Si$) and argon ($C_4H_{12}Si:Ar=1:10$), which was ionized with a RF plasma.

Next, a protective layer was formed by an ion beam method, so that the total thickness of the diffusion preventing layer and the protective layer was 2.6 nm.

After forming the protective layer, the diffusion preventing layer was examined with XPS. A layer of 3 mol % C—$SiO_2$—3 mol % CoO (the content of $SiO_2$ is 3 mol %, and the content of CoO is 3 mol %, with the balance of C) having a thickness of 0.1 nm was formed. It is considered that CoO included in the diffusion preventing layer is a diffused substance from the perpendicular magnetic layer, and C is a deposited substance from tetramethylsilane and a diffused substance from the protective layer.

Next, a lubricating layer made of perfluoropolyether was formed on the protective layer by the dipping method, and a magnetic recording medium was obtained.

Regarding each layer constituting the magnetic recording medium, type and deposition temperature of the perpendicular magnetic layer; composition, thickness, method of formation, type of target, and gas used for formation of the diffusion preventing layer; and total thickness of the diffusion preventing layer and the protective layer, are described in Table 1.

[Performance]

(Corrosion Resistance)

After the magnetic recording medium was left for 96 hours under the environment of 90° C. and 90% RH, corrosion resistance was evaluated by counting corrosion spots (pieces/plane) generated on the surface of the magnetic recording medium using an optical surface inspection apparatus. At this time, the detection accuracy was set to 5 µm or more in diameter. The measurement results of the corrosion spots are described in Table 1.

Examples 2 to 10

The same procedure was performed as in Example 1, except that the diffusion preventing layer was manufactured under the conditions described in Table 1.

Example 11

The same procedure was performed as in Example 1, except that the [Preparation of magnetic recording medium] was changed to the following method.
[Preparation of Magnetic Recording Medium]

An underlayer of 50 at % Cr—50 at % Ti (an alloy in which the content of Cr is 50 at %, and the content of Ti is 50 at %) having a thickness of 50 nm, and a soft magnetic underlayer of 75 at % Co—20 at % Ta-5 at % B alloy having a thickness of 25 nm, were deposited onto a heat resistant glass substrate in this order. After heating the substrate to 250° C., a Cr underlayer with a thickness of 10 nm was deposited. In depositing, the DC magnetron sputtering method was used.

Next, a MgO underlayer having a thickness of 2 nm was deposited using the RF sputtering method.

After heating the substrate to 520° C., a perpendicular magnetic layer made of 82 mol % (52 at % Fe-48 at % Pt)—18 mol % $SiO_2$ having a thickness of 5 nm, and a perpendicular magnetic layer made of 52 at % Fe—48 at % Pt having a thickness of 3 nm, were deposited using the DC magnetron sputtering method.

Next, a diffusion preventing layer was deposited by performing ion implantation on the surface of the Fe—Pt perpendicular magnetic layer. The ion implantation was performed using, as a reaction gas, a mixed gas of tetramethylsilane ($C_4H_{12}Si$) and argon ($C_4H_{12}Si$:Ar=1:10), which was ionized with a RF plasma.

Next, a protective layer was formed by an ion beam method, so that the total thickness of the diffusion preventing layer and the protective layer was 2.2 nm.

After forming the protective layer, the diffusion preventing layer was examined with XPS. A layer of $3SiO_2$—$2Fe_2O_3$—C(the content of $SiO_2$ is 3 mol %, and the content of $Fe_2O_3$ is 2 mol %, with the balance of C) having a thickness of 0.15 nm was formed. It is considered that $Fe_2O_3$ included in the diffusion preventing layer is a diffused substance from the perpendicular magnetic layer, and C is a deposited substance from tetramethylsilane and a diffused substance from the protective layer.

Next, a lubricating layer made of perfluoropolyether was formed on the protective layer by the dipping method, and a magnetic recording medium was obtained.

Examples 12 to 19

The same procedure was performed as in Example 11, except that the diffusion preventing layer was manufactured under the conditions described in Table 1.
<Comparative Examples 1 and 2>

The same procedure was performed as in Example 1, except that in the [Preparation of magnetic recording medium], the diffusion preventing layer was not formed, and the thickness of the protective layer was changed to 2.4 nm. The forming temperature of the perpendicular magnetic layer was set to 290° C. in Comparative Example 1, and 310° C. in Comparative Example 2.

Comparative Example 3

The same procedure was performed as in Example 11, except that in the [Preparation of magnetic recording medium], the diffusion preventing layer was not formed, and the thickness of the protective layer was changed to 2.2 nm.

Regarding each layer constituting the magnetic recording media of the Examples and the Comparative Examples, type and deposition temperature of the perpendicular magnetic layer; composition, thickness, method of formation, type of target, and gas used for formation of the diffusion preventing layer; total thickness of the diffusion preventing layer and the protective layer; and the measurement result of the corrosion spot; are described in Table 1.

TABLE 1

| | MAGNETIC RECORDING MEDIUM ||||||||
| | PERPENDICULAR MAGNETIC LAYER || DIFFUSION PREVENTING LAYER |||| TOTAL THICKNESS OF DIFFUSION PREVENTING LAYER AND PROTECTIVE LAYER [nm] | CHARACTERISTICS CORROSION SPOTS (PIECES/PLANE) |
| | TYPE | DEPOSITION TEMPERATURE [° C.] | COMPOSITION | THICKNESS [nm] | FORMATION METHOD | TARGET | GAS USED FOR FORMATION | | |
| EXAMPLE 1 | Co—Cr ALLOY, INCLUDING OXIDE | 310 | $3SiO_2$—3CoO—C | 0.15 | ion implantation | — | tetramethylsilane, Ar | 2.6 | 3.5 |
| EXAMPLE 2 | Co—Cr ALLOY, INCLUDING OXIDE | 310 | $3SiO_2$—3CoO—C | 0.15 | ion implantation | — | tetramethylsilane, Ar | 2.4 | 14 |
| EXAMPLE 3 | Co—Cr ALLOY, INCLUDING OXIDE | 310 | $3SiO_2$—3CoO—C | 0.15 | ion implantation | — | tetramethylsilane, Ar | 2.2 | 56 |
| EXAMPLE 4 | Co—Cr ALLOY, INCLUDING OXIDE | 310 | $3SiO_2$—3CoO—C | 0.07 | ion implantation | — | tetramethylsilane, Ar | 2.6 | 4 |

TABLE 1-continued

MAGNETIC RECORDING MEDIUM

| | PERPENDICULAR MAGNETIC LAYER | | DIFFUSION PREVENTING LAYER | | | | | TOTAL THICKNESS OF DIFFUSION PREVENTING LAYER AND PROTECTIVE LAYER [nm] | CHARACTERISTICS CORROSION SPOTS (PIECES/PLANE) |
|---|---|---|---|---|---|---|---|---|---|
| | TYPE | DEPOSITION TEMPERATURE [° C.] | COMPOSITION | THICKNESS [nm] | FORMATION METHOD | TARGET | GAS USED FOR FORMATION | | |
| EXAMPLE 5 | Co—Cr ALLOY, INCLUDING OXIDE | 310 | 3SiO$_2$—3CoO—C | 0.07 | ion implantation | — | tetramethyl-silane, Ar | 2.4 | 20 |
| EXAMPLE 6 | Co—Cr ALLOY, INCLUDING OXIDE | 310 | 3SiO$_2$—3CoO—C | 0.07 | ion implantation | — | tetramethyl-silane, Ar | 2.2 | 108 |
| EXAMPLE 7 | Co—Cr ALLOY, INCLUDING OXIDE | 310 | 4SiC—3CoO—C | 0.15 | reactive RF sputtering | SiC | tetramethyl-silane, Ar | 2.2 | 80 |
| EXAMPLE 8 | Co—Cr ALLOY, INCLUDING OXIDE | 310 | 10Si—90C | 0.15 | RF sputtering | Si | Ar | 2.2 | 100 |
| EXAMPLE 9 | Co—Cr ALLOY, INCLUDING OXIDE | 310 | 10SiC—90C | 0.15 | RF sputtering | SiC | Ar | 2.2 | 90 |
| EXAMPLE 10 | Co—Cr ALLOY, INCLUDING OXIDE | 310 | 10SiO$_2$—90C | 0.15 | RF sputtering | SiO$_2$ | Ar | 2.2 | 90 |
| EXAMPLE 11 | Fe—Pt ALLOY, INCLUDING OXIDE | 520 | 3SiO$_2$—2Fe$_2$O$_3$—C | 0.15 | ion implantation | — | tetramethyl-silane, Ar | 2.2 | 70 |
| EXAMPLE 12 | Fe—Pt ALLOY, INCLUDING OXIDE | 520 | 4SiC—2Fe$_2$O$_3$—C | 0.15 | reactive RF sputtering | SiC | tetramethyl-silane, Ar | 2.2 | 75 |
| EXAMPLE 13 | Fe—Pt ALLOY, INCLUDING OXIDE | 520 | 10Si—90C | 0.15 | RF sputtering | Si | Ar | 2.2 | 100 |
| EXAMPLE 14 | Fe—Pt ALLOY, INCLUDING OXIDE | 520 | 10SiC—90C | 0.15 | RF sputtering | SiC | Ar | 2.2 | 90 |
| EXAMPLE 15 | Fe—Pt ALLOY, INCLUDING OXIDE | 520 | 10SiO$_2$—90C | 0.15 | RF sputtering | SiO$_2$ | Ar | 2.2 | 90 |
| EXAMPLE 16 | Co—Cr ALLOY, INCLUDING OXIDE | 310 | 10Ti—90C | 0.15 | DC sputtering | Ti | Ar | 2.2 | 100 |
| EXAMPLE 17 | Co—Cr ALLOY, INCLUDING OXIDE | 310 | 10Cr—90C | 0.15 | DC sputtering | Cr | Ar | 2.2 | 100 |
| EXAMPLE 18 | Co—Cr ALLOY, INCLUDING OXIDE | 310 | 10B—90C | 0.15 | RF sputtering | B$_4$C | Ar | 2.2 | 100 |
| EXAMPLE 19 | Co—Cr ALLOY, INCLUDING OXIDE | 310 | 10Ru—90C | 0.15 | DC sputtering | Ru | Ar | 2.2 | 100 |
| COMPARATIVE EXAMPLE 1 | Co—Cr ALLOY, INCLUDING OXIDE | 290 | — | — | — | — | — | 2.4 | 150 |
| COMPARATIVE EXAMPLE 2 | Co—Cr ALLOY, INCLUDING OXIDE | 310 | — | — | — | — | — | 2.4 | 170 |
| COMPARATIVE EXAMPLE 3 | Fe—Pt ALLOY, INCLUDING OXIDE | 520 | — | — | — | — | — | 2.2 | 200 |

From Table 1, in the Examples 1 to 19, the number of corrosion spots was 108 pieces per plane or less. On the other hand, in the Comparative Examples 1 to 3, the number of corrosion spots was 150 pieces per plane or more.

The magnetic recording media according to the Examples 1 to 19 differs from the magnetic recording media according to the Comparative Examples 1 to 3 in that a diffusion preventing layer that contains at least one of the components selected from the group consisting of Si, Ti, Cr, B, and Ru, or either a carbide, an oxide, or both, of the at least one component is provided between the perpendicular magnetic layer and the protective layer. It was apparent that, because of the difference, the number of corrosion spots can be reduced and corrosion resistance can be improved, in the magnetic recording media according to the Examples 1 to 19. Therefore, the magnetic recording medium according to the present embodiment can be effectively used in the magnetic recording and reproducing apparatus.

As described above, the embodiments have been described, but the above embodiments are presented as examples, and the present invention is not limited to the above embodiments. The above embodiment can be implemented in various other embodiments, and various combinations, omissions, replacements, changes, and the like can be made without departing from the scope of the invention. These embodiments and modifications thereof are included in the scope of the invention, and are also included in the scope of the invention described in the claims and the equivalent thereof.

Description of the Reference Numeral 10, 20, 31 magnetic recording medium
11, 21 non-magnetic substrate
12 soft magnetic layer
13, 22 seed layer
14 underlayer
15, 24 perpendicular magnetic layers
151, 241 uppermost layer
152, 242 layer other than uppermost layer
16, 25 diffusion preventing layer
17, 26 protective layer
23-1 first underlayer
23-2 second underlayer
30 magnetic recording and reproducing apparatus
32 magnetic recording medium driving part
33 magnetic head
34 magnetic head driving part
35 recording and reproducing signal processing part

What is claimed is:

1. A method of manufacturing a magnetic recording medium comprising:
    forming a diffusion preventing layer by a reactive sputtering method, an ion implantation method, or an ion etching method, wherein
    the magnetic recording medium includes a non-magnetic substrate; an underlayer; a perpendicular magnetic layer; the diffusion preventing layer; and a protective layer, wherein
    the underlayer, the perpendicular magnetic layer, the diffusion preventing layer, and the protective layer are layered on the non-magnetic substrate in this order,
    the perpendicular magnetic layer has a multi-layer structure,
    the perpendicular magnetic layer includes an uppermost layer and at least one layer other than the uppermost layer, the uppermost layer including Co or Fe in magnetic particles, and the at least one layer other than the uppermost layer including an oxide,
    the diffusion preventing layer is provided between the perpendicular magnetic layer and the protective layer,
    the diffusion preventing layer includes at least one component selected from a group consisting of Si, Ti, Cr, B, and Ru, or either a carbide, an oxide, or both, of the at least one component,
    the diffusion preventing layer includes carbon, and
    a content of carbon in the diffusion preventing layer is 20 at % or more.

2. The method of manufacturing a magnetic recording medium according to claim 1, wherein the diffusion preventing layer is formed by the ion implantation method, and the diffusion preventing layer is formed using a gas containing an organosilicon compound as a source of Si.

3. The method of manufacturing a magnetic recording medium according to claim 1, wherein a total content of Si, Ti, Cr, B, and Ru contained in the diffusion preventing layer is 0.5 at % to 10 at %.

4. The method of manufacturing a magnetic recording medium according to claim 1, wherein a total content of Si, Ti, Cr, B, and Ru contained in the diffusion preventing layer is 2 at % to 4 at %.

* * * * *